(12) United States Patent
Nomura et al.

(10) Patent No.: US 7,525,605 B2
(45) Date of Patent: Apr. 28, 2009

(54) LIQUID CRYSTAL DISPLAY DEVICE AND MANUFACTURING METHOD THEREOF

(75) Inventors: Shinichiro Nomura, Tottori (JP); Takayuki Kato, Tottori (JP); Takao Atarashiya, Tottori (JP); Hiroki Sugiyama, Tottori (JP); Satoshi Moritai, Tottori (JP)

(73) Assignee: Epson Imaging Devices Corporation, Nagano (JP)

( * ) Notice: Subject to any disclaimer, the term of this patent is extended or adjusted under 35 U.S.C. 154(b) by 150 days.

(21) Appl. No.: 11/802,800

(22) Filed: May 25, 2007

(65) Prior Publication Data
US 2007/0273800 A1 Nov. 29, 2007

(30) Foreign Application Priority Data
May 29, 2006 (JP) ............... 2006-147713
Mar. 13, 2007 (JP) ............... 2007-062949

(51) Int. Cl.
*G02G 1/1343* (2006.01)
(52) U.S. Cl. ............... 349/38; 349/43; 349/33
(58) Field of Classification Search .......... 349/33, 349/36–38, 43–44
See application file for complete search history.

(56) References Cited

U.S. PATENT DOCUMENTS

| 5,580,796 A | 12/1996 | Takizawa et al. |
| 6,356,318 B1 | 3/2002 | Kawahata |
| 6,839,099 B2 | 1/2005 | Fukunishi |
| 2003/0038306 A1* | 2/2003 | Izumi et al. ............... 257/222 |
| 2004/0109101 A1 | 6/2004 | Kim et al. |
| 2004/0114059 A1 | 6/2004 | Lee et al. |
| 2004/0141100 A1* | 7/2004 | Tsubata et al. ............. 349/44 |
| 2005/0092992 A1* | 5/2005 | Nagata et al. .............. 257/59 |
| 2005/0285987 A1* | 12/2005 | Azumada et al. ........... 349/43 |
| 2006/0009108 A1* | 1/2006 | Shigeno .................... 445/24 |
| 2006/0044487 A1 | 3/2006 | Okada et al. |
| 2006/0267969 A1* | 11/2006 | Doi et al. .................. 345/204 |
| 2007/0146566 A1* | 6/2007 | Hosoya .................... 349/43 |
| 2008/0198108 A1* | 8/2008 | Aoki ....................... 345/87 |
| 2008/0254598 A1* | 10/2008 | Yamazaki et al. .......... 438/473 |

FOREIGN PATENT DOCUMENTS

| JP | 02-081029 | 3/1990 |
| JP | 2584290 B2 | 11/1996 |
| JP | 2001-013520 | 1/2001 |
| JP | 2002-055361 | 2/2002 |
| JP | 2005-506575 A | 3/2005 |
| JP | 2006-071946 | 3/2006 |

* cited by examiner

*Primary Examiner*—Ellen Kim
(74) *Attorney, Agent, or Firm*—McDermott Will & Emery LLP

(57) ABSTRACT

An auxiliary capacitance line and a terminal portion of a liquid crystal display device are made of an Al or Al alloy layer and an Mo layer. The edge portions of a lower auxiliary capacitance electrode and the terminal portion are sequentially coated with a first insulating film, a second insulating film that is thinner than the first insulating film, and a third insulating film. The lower auxiliary capacitance electrode is coated with the second insulating film, and an upper auxiliary capacitance electrode is laid on the surface of the second insulating film on the lower auxiliary capacitance electrode.

8 Claims, 9 Drawing Sheets

EMBODIMENT

EXAMPLE

REACTIVE ION ETCHING (RIE) METHOD

PLASMA ETCHING (PE) METHOD

LIQUID CRYSTAL DISPLAY DEVICE AND MANUFACTURING METHOD THEREOF

This application is based on Japanese Patent Applications Nos. 2006-147713 and 2007-062949 filed on May 29, 2006 and Mar. 13, 2007 respectively, the contents of which are hereby incorporated by reference.

BACKGROUND OF THE INVENTION

1. Field of the Invention

The present invention relates to liquid crystal display devices and manufacturing methods thereof. More particularly, the present invention relates to a liquid crystal display device that suffers less from a short circuit occurring in an auxiliary capacitance forming region, that can increase an auxiliary capacitance without reducing the aperture ratio of each pixel, and that is suitable for a relatively small pixel area or for achieving high definition, and relates to a manufacturing method of such a liquid crystal display device.

2. Description of Related Art

In recent years, liquid crystal display devices have come to be used widely not only in information communications apparatuses but also in commonly used electric apparatuses. The liquid crystal display device is built with: a pair of substrates that are made of glass, for example, and have an electrode and the like formed on the surface thereof, and a liquid crystal layer formed between the pair of substrates. When a voltage is applied to the electrode formed on the substrate, the liquid crystal molecules are re-oriented, and accordingly the transmittance of light is changed. In this way, the liquid crystal display device displays various images.

On the surface of one substrate of such a liquid crystal display device, scanning lines and signal lines are arranged so as to form a matrix. In each region surrounded by those lines, provided is an array substrate in which a thin-film transistor (TFT) that serves as a switching element for driving liquid crystal, a display electrode that applies a voltage to the liquid crystal, and an auxiliary capacitance line that constitutes an auxiliary capacitance for retaining signals are formed. On the surface of the other substrate thereof, provided is a color filter substrate on which, for example, color filters of different colors including red (R), green (G), and blue (B) and a common electrode are formed. Between the two substrates described above, the liquid crystal is sealed.

The auxiliary capacitance line formed on the array substrate is provided to form an auxiliary capacitance that retains the electric charge of a signal fed from a signal line for a given time period. In general, the auxiliary capacitance is formed as a capacitor in which part of the auxiliary capacitance line serves as one electrode, part of the drain or pixel electrode of the TFT serves as the other electrode, and a gate insulating film coating the gate electrode of the TFT serves as a dielectric. Incidentally, the auxiliary capacitance line is generally formed of a light-shielding conductive material such as aluminum, molybdenum, or chromium.

Now, from the viewpoint of preventing crosstalk or flicker in the liquid crystal display device, the larger the auxiliary capacitance, the better. However, as the liquid crystal display device becomes more compact and achieves higher definition due to recent technological innovation, the size of individual pixels is reduced. This makes it practically difficult to provide a large auxiliary capacitance.

As a technology that can solve this problem, there has conventionally been known a liquid crystal display device disclosed in JP-A-2005-506575. An array substrate 70 of this liquid crystal display device will be described with reference to FIGS. 8A and 8B. FIG. 8A is a plan view of the array substrate, and FIG. 8B is a sectional view taken on the line X-X of FIG. 8A.

The array substrate 70 has, on top of an insulating substrate 71, scanning lines 72, auxiliary capacitance lines 73, auxiliary capacitance patterns 74, a gate insulating film 75, a semiconductor pattern 76, signal lines 77, auxiliary capacitance conductive patterns 78, pixel electrodes 79, a protective insulating film 80, contact holes 81, and openings 82. Furthermore, thin-film transistors TFT each having a gate electrode G, a source electrode S, and a drain electrode D are provided one for each of the pixels.

The auxiliary capacitance is formed with the auxiliary capacitance pattern 74 and the auxiliary capacitance conductive pattern 78 that overlap one another with the gate insulating film 75 laid therebetween. With this configuration, as compared with a configuration in which an auxiliary capacitance is formed with the auxiliary capacitance pattern 74 and the pixel electrode 79 that overlap one another, it is possible to offer a larger capacitance if these configurations are equal in the overlapping area.

In the array substrate 70 of the liquid crystal display device disclosed in JP-A-2005-506575, the gate insulating film 75 serves as a dielectric. Thus, on the array substrate 70, the auxiliary capacitance can be increased by making the gate insulating film 75 thinner. However, when the gate insulating film 75 itself is made thinner, it becomes difficult to maintain electrical isolation between the gate electrode G and the scanning line 72 that are coated with the gate insulating film 75 and other members.

To solve this problem, Japanese Patent No. 2,584,290 proposes a liquid crystal display device 90. An array substrate of the liquid crystal display device 90 will be described with reference to FIG. 9 and FIGS. 10A to 10G FIG. 9 is a plan view showing a few pixels of the array substrate disclosed in Japanese Patent No. 2,584,290, and FIGS. 10A to 10G are partial sectional views sequentially showing the manufacturing process of the array substrate shown in FIG. 9.

First, an auxiliary capacitance line 92 made of ITO (indium tin oxide) is formed and patterned on an insulating substrate 91 made of a glass plate, followed by the formation and patterning of a gate metal film 93 (FIG. 10A).

Then, by plasma chemical vapor deposition (CVD) or the like, an insulating film 94 made of SiNx or SiOx, an amorphous semiconductor film 95 that serves as an active layer and is made of a-Si, for example, and an impurity-doped ohmic contact semiconductor film 96 made of an n+a-Si film, for example, are formed in succession (FIG. 10B). At this point, the film thickness A of the insulating film 94 is set so as to be thick enough to prevent a short circuit between the drain and the gate and between the source and the gate; for example, the film thickness thereof is set so that X=4000 Å.

Next, etching is performed on the ohmic contact semiconductor film 96 and the amorphous semiconductor film 95 by using the same resist so as to form a given pattern (FIG. 10C). Then, a resist (not shown in FIGS. 10A to 10G) is applied that is patterned so as to have an opening in its portion (the portion surrounded by dashed line in FIG. 9) where the auxiliary capacitance line 92 and a display transparent electrode 97, which is formed in the following process, will overlap. Then, etching is performed thereon by using an etchant for the insulating film 94 so that the insulating film 94 achieves a desired film thickness (Y=2000 Å) as an auxiliary capacitance insulating film (FIG. 10D).

Next, the display transparent electrode 97 made of ITO is formed and patterned (FIG. 10E). Then, a drain-and-source metal film 98 is formed and patterned (FIG. 10F), and etching is then performed to remove the ohmic contact semiconductor film 96 left in the channel portion of the TFT. In this way, the array substrate for a liquid crystal display device is obtained (FIG. 10G). The array substrate thus obtained is placed so as to face a common electrode substrate with a liquid crystal material laid in between, whereby the liquid crystal display device 90 is obtained.

In the conventional technology described above, an auxiliary capacitance electrode portion of the auxiliary capacitance line 92 and the pixel electrode 97 correspond to the electrodes of a capacitor, and the insulating film 94 present between the auxiliary capacitance electrode portion of the auxiliary capacitance line 92 and the pixel electrode 97 corresponds to the dielectric of the capacitor. In this example, while the thickness X of the insulating film 94 laid on the gate electrode 93 is 4000 Å, the thickness Y of the insulating film 94 laid on the auxiliary capacitance line 92 is 2000 Å. This advantageously prevents a short circuit from easily occurring between the drain and the gate and between the source and the gate, and helps secure a required auxiliary capacitance without increasing the area of the auxiliary capacitance line 92.

On the array substrate of the liquid crystal display device 90 disclosed in Japanese Patent No. 2,584,290, the thickness of only the gate insulating film laid on the surface of the auxiliary capacitance electrode portion of the auxiliary capacitance line 92 is made partially thinner by etching. By doing so, the auxiliary capacitance is increased while maintaining electrical isolation between the gate electrode and the scanning line that are coated with the gate insulating film and other members.

However, it was found that just making thinner the gate insulating film laid on the surface of the auxiliary capacitance line cannot prevent a short circuit from easily occurring between the auxiliary capacitance electrode portion and an upper auxiliary capacitance electrode that is placed face to face with the auxiliary capacitance electrode portion.

As a result of an intensive research on the causes of a short circuit that occurs between an auxiliary capacitance electrode portion and an upper auxiliary capacitance electrode when an auxiliary capacitance is formed by using an insulating film that is formed by partially making thinner an insulating film laid on the surface of the auxiliary capacitance electrode portion, the inventors of the present invention have found out that a terminal portion provided in the signal lines, the scanning lines, etc., for receiving a driving signal inputted from the outside, for instance, is responsible for such a short circuit.

That is, at the time of manufacturing, an insulating film including a passivation film is laid on the upper auxiliary capacitance electrode and the terminal portion. This insulating film is removed by etching in the following process, so that the upper auxiliary capacitance electrode and the terminal portion are exposed.

At this point, the thickness of the insulating film laid on the terminal portion is significantly thicker than that of the insulating film laid on the upper auxiliary capacitance electrode. This is because the insulating film laid on the terminal portion includes not only the insulating film laid on the upper auxiliary capacitance electrode but also a gate insulating film.

Thus, even when etching of the insulating film laid on the upper auxiliary capacitance electrode is completed, etching of the insulating film laid on the terminal portion is not yet completed. As a result, until etching of the insulating film laid on the terminal portion is completed, the unprotected upper auxiliary capacitance electrode is continuously exposed to an etching atmosphere. This results in damage to the insulating film present between the auxiliary capacitance electrode portion and the upper auxiliary capacitance electrode.

In this case, if an insulating film having a sufficient thickness is present between the auxiliary capacitance electrode portion and the upper auxiliary capacitance electrode, damage, if any, to the upper auxiliary capacitance electrode causes very few problems.

However, this is not the case with a configuration in which the space between the auxiliary capacitance electrode portion and the upper auxiliary capacitance electrode is greatly reduced to increase the auxiliary capacitance. In such a configuration, due to the damage to the upper auxiliary capacitance electrode, part of the upper auxiliary capacitance electrode breaks a thin insulating film laid under it, and is then short-circuited with the auxiliary capacitance electrode portion.

The inventors of the present invention reviewed the configuration of the insulating film laid on the upper auxiliary capacitance electrode and the terminal portion and also reviewed the manufacturing process, and have found out that it is possible to greatly reduce the occurrence of a short circuit between the auxiliary capacitance electrode portion and the upper auxiliary capacitance electrode portion.

SUMMARY OF THE INVENTION

The present invention provides a liquid crystal display device that reduces the thickness of an insulating film provided in a region where an auxiliary capacitance is formed, so as to secure a large auxiliary capacitance even in a pixel with a small pixel area or a pixel that achieves high definition without reducing the aperture ratio of each pixel, the liquid crystal display device that can reduce the occurrence of a short circuit between an auxiliary capacitance electrode portion and an upper auxiliary capacitance electrode, and provides a manufacturing method thereof.

According to one aspect of the present invention, a liquid crystal display device is provided with: a plurality of signal lines and a plurality of scanning lines that are arranged on a transparent substrate so as to form a matrix; pixel regions that correspond to regions partitioned by the signal lines and the scanning lines; a plurality of auxiliary capacitance lines that are formed so as to be parallel with the scanning lines, the plurality of auxiliary capacitance lines being provided with auxiliary capacitance electrode portions, one for each of the pixel regions; upper auxiliary capacitance electrodes that are provided one for each of the auxiliary capacitance electrode portions; thin-film transistors that are provided one for each of the pixel regions; pixel electrodes that are electrically connected to drain electrodes of the thin-film transistors; terminal portions that are formed on the transparent substrate for receiving a signal from the outside; and a first insulating film, a second insulating film, and a third insulating film that are formed on the transparent substrate. Here, in each of the auxiliary capacitance electrode portions, the first insulating film has a window portion, the second insulating film is formed on the surface of the first insulating film in such a way as to cover the window portion, the upper auxiliary capacitance electrode is formed on the surface of the second insulating film, the third insulating film is formed on the surface of the upper auxiliary capacitance electrode, the third insulating film has an auxiliary capacitance contact hole formed therein, and the upper auxiliary capacitance electrode and the pixel electrode are electrically connected via the auxiliary capacitance contact hole. In each of the terminal portions, in the first insulating film, the second insulating film, and the third insulating film that are laid on top of another, a terminal-portion contact hole is formed in which the edge of an opening in the first insulating film is coated with the second insulating film.

According to another aspect of the invention, the method of the present invention is applicable to the manufacturing of the liquid crystal display device including: a plurality of signal lines and a plurality of scanning lines that are arranged on a transparent substrate so as to form a matrix; pixel regions that correspond to regions partitioned by the signal lines and the scanning lines; a plurality of auxiliary capacitance lines that are formed so as to be parallel with the scanning lines, the plurality of auxiliary capacitance lines being provided with auxiliary capacitance electrode portions, one for each of the pixel regions; thin-film transistors that are provided one for each of the pixel regions; pixel electrodes that are electrically connected to drain electrodes of the thin-film transistors; and terminal portions that are formed at the edge of the transparent substrate for receiving a signal from the outside. The aforementioned method is provided with the steps of: forming gate electrodes of the thin-film transistors, the scanning lines, the auxiliary capacitance lines, and the terminal portions by performing etching, after a conductive metal layer is formed all over the surface of the transparent substrate, on the conductive metal layer thus formed; performing etching, after a first insulating film is formed in such a way as to coat the entire surface of the transparent substrate, on the first insulating film laid on the auxiliary capacitance electrode portions and the terminal portions; forming a second insulating film in such a way as to coat the entire surface of the transparent substrate; forming a semiconductor layer on the surface of the second insulating film in such a way as to coat the top faces of the gate electrodes of the thin-film transistors; forming, on the surface of the second insulating film, the signal lines, source electrodes and drain electrodes of the thin-film transistors, and upper auxiliary capacitance electrodes located above the auxiliary capacitance electrode portions; forming auxiliary capacitance contact holes and terminal-portion contact holes by performing etching, after a third insulating film is formed in such a way as to coat the entire surface of the transparent substrate, on the third insulating film laid on the upper auxiliary capacitance electrodes and the second insulating film and the third insulating film laid on the terminal portions; and electrically connecting the pixel electrodes and the upper auxiliary capacitance electrodes via the auxiliary capacitance contact holes.

With the configuration described above, the liquid crystal display device according to the invention offers the following advantages. Since the second insulating film is formed as a dielectric layer of an auxiliary capacitance, it is possible to offer a large auxiliary capacitance while ensuring an adequate thickness of the first insulating film and the second insulating film that serve as a gate insulating film without increasing the area of an auxiliary capacitance forming region. This helps realize a liquid crystal display device that can increase the aperture ratio and reduce display trouble such as crosstalk or flicker. Additionally, in the terminal portion, since the edge of the opening in the first insulating film is coated with the second insulating film, the first insulating film is not present in the terminal portion. Thus, at the time of forming a terminal-portion contact hole in the terminal portion, it is possible to reduce the time to complete etching of the insulating film (the second insulating film and the third insulating film) laid on the terminal portion. This helps reduce the time during which the upper auxiliary capacitance electrode is exposed to an etching atmosphere, thereby reducing damage to the upper auxiliary capacitance electrode and the second insulating film laid under it.

Moreover, in the terminal-portion contact hole, the opening in the first insulating film is formed concurrently with the formation of the window portion of the first insulating film in the auxiliary capacitance electrode portion. This makes it possible to reduce the time to complete etching of the insulating film (the second insulating film and the third insulating film) laid on the terminal portion at the time of forming a terminal-portion contact hole in the terminal portion. This helps reduce the time during which the upper auxiliary capacitance electrode is exposed to an etching atmosphere, thereby reducing damage to the upper auxiliary capacitance electrode and the second insulating film laid under it.

Furthermore, there is included a step of performing etching on the first insulating film laid on the auxiliary capacitance electrode portion and the terminal portion. As a result, in the subsequent step of forming the auxiliary capacitance contact hole and the terminal-portion contact hole by performing etching on the third insulating film laid on the upper auxiliary capacitance electrode and the second insulating film and the third insulating film laid on the terminal portion, the time during which the upper auxiliary capacitance electrode is exposed to an etching atmosphere is reduced. This helps reduce damage to the upper auxiliary capacitance electrode and the second insulating film laid under it.

DETAILED DESCRIPTION OF PREFERRED EMBODIMENTS

Hereinafter, preferred embodiments of the present invention will be described specifically with reference to the accompanying drawings. It should be understood, however, that the embodiment presented below is simply intended to give an example of a liquid crystal display device and a manufacturing method thereof that embodies the technical idea of the present invention, and therefore the liquid crystal display device and the manufacturing method thereof specifically described below are not intended to limit in any way the manner in which to carry out the present invention. That is, the present invention finds wide application in the technical fields to which the appended claims are directed.

Figure 1:
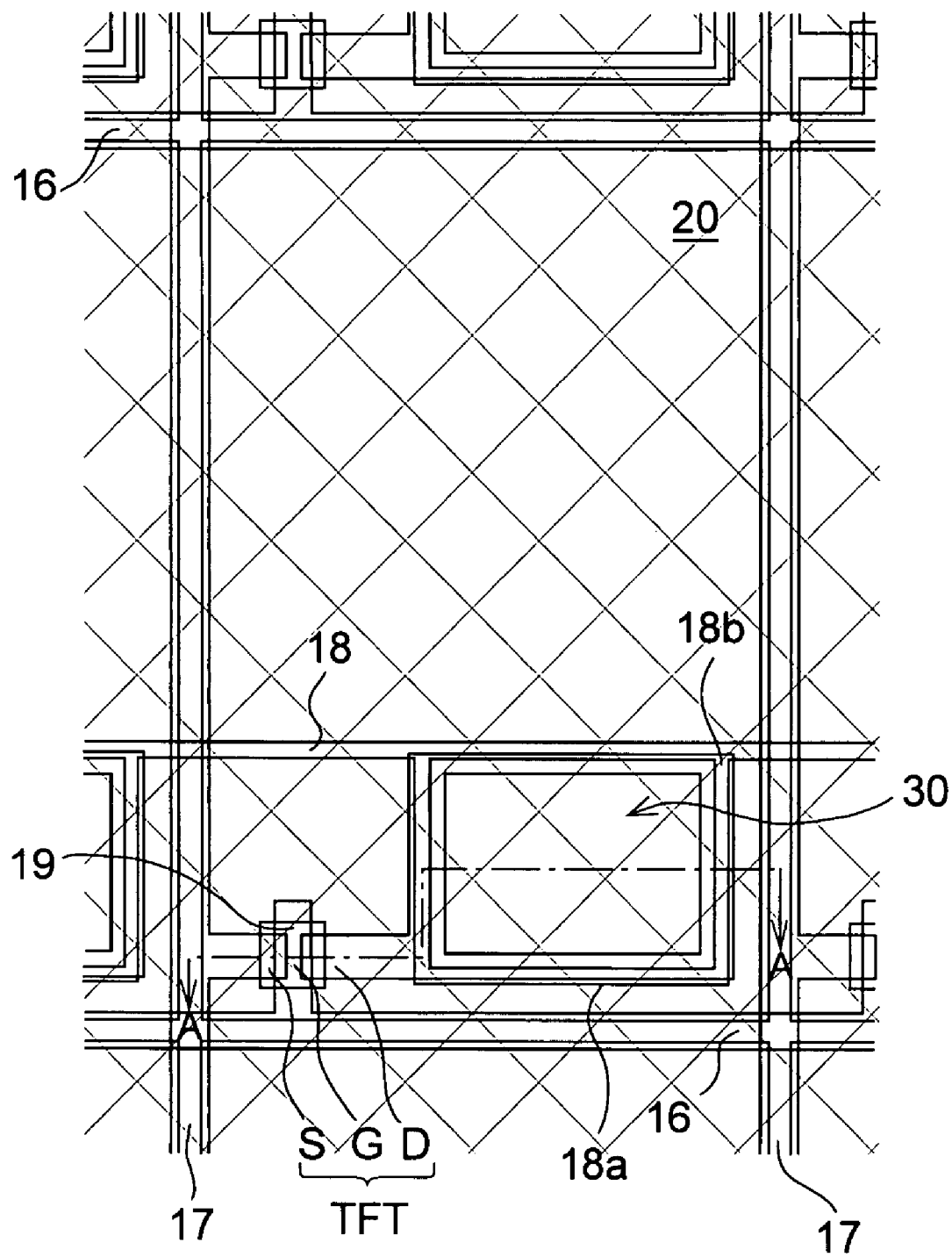
FIG. 1 is an enlarged plan view of one pixel of an array substrate of a liquid crystal display device according to an embodiment, as seen through a color filter substrate.
Figure 2:
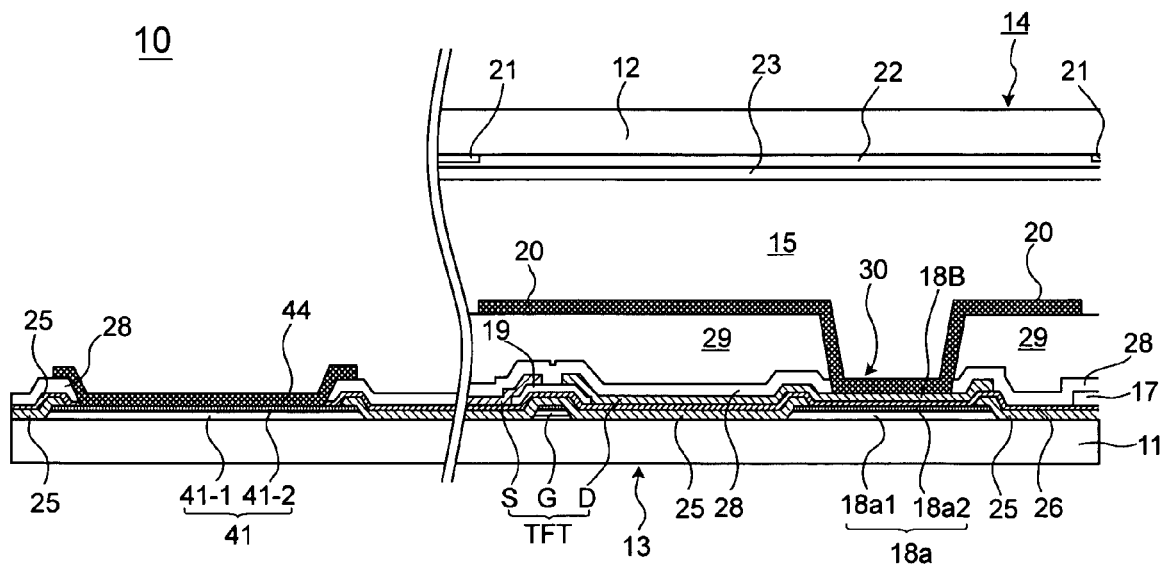
FIG. 2 is a sectional view taken on the line A-A of FIG. 1.
Figure 3:
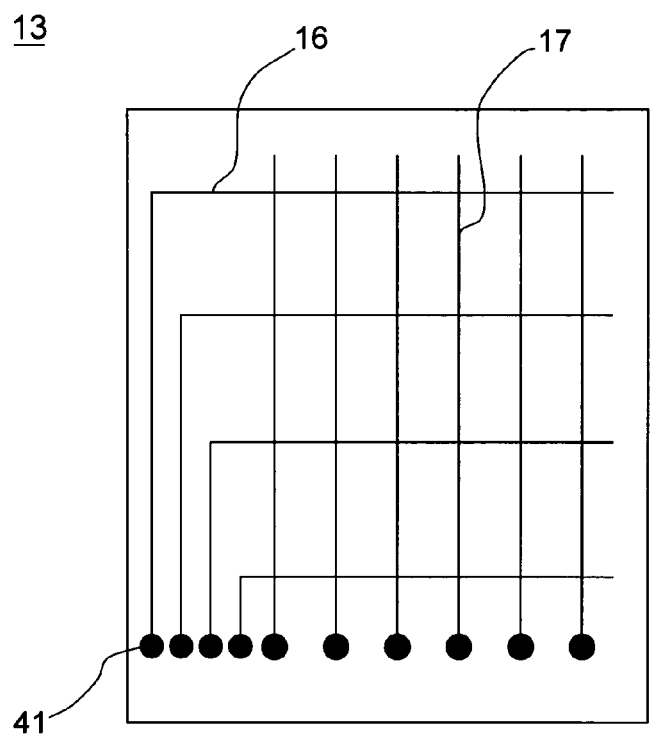
FIG. 3 is a schematic plan view showing the liquid crystal display device in its entirety.

FIG. 1 is an enlarged plan view of one pixel of an array substrate of a liquid crystal display device according to an embodiment, as seen through a color filter substrate. FIG. 2 is a sectional view taken on the line A-A of FIG. 1. FIG. 3 is a schematic plan view showing the liquid crystal display device in its entirety for explaining the arrangement of scanning lines, signal lines, and terminal portions. FIGS. 4A to 4F are sectional views showing a manufacturing process of the array substrate shown in FIG. 1 until the completion of an upper auxiliary capacitance electrode. FIGS. 5A to 5D are sectional views showing the manufacturing process of the array substrate shown in FIG. 1 after the completion of the upper auxiliary capacitance electrode. It is to be noted that FIGS. 4A to 4F and FIGS. 5A to 5D each correspond to the sectional view taken on the line A-A of FIG. 1 and include the terminal portion.

A liquid crystal display device 10 of this embodiment is built with a pair of substrates: an array substrate 13 and a color filter substrate 14, and a liquid crystal layer 15. The array substrate 13 is formed as a transparent substrate 11 made of glass, for example, on which different conductors are formed. The color filter substrate 14 is formed as a transparent substrate 12 on which a color filter and the like are formed. The liquid crystal layer 15 is sealed between the array substrate 13 and the color filter substrate 14 which are bonded together with a sealing member (not illustrated) at their surface edges.

The array substrate 13 is provided with a scanning line 16, a signal line 17, an auxiliary capacitance line 18, a TFT, and a pixel electrode 20. A plurality of the scanning lines 16 and a plurality of the signal lines 17 are arranged so as to form a matrix. The auxiliary capacitance line 18 is provided between the adjacent scanning lines 16 so as to be parallel therewith. The TFT is composed of a source electrode S, a gate electrode G, a drain electrode D, and a semiconductor layer 19. The pixel electrode 20 is provided in such a way as to cover a pixel region surrounded by the scanning lines 16 and the signal lines 17, and is formed of a transparent conductive material such as ITO (indium tin oxide) or IZO (indium zinc oxide). Although amorphous silicon (a-Si) is typically used as the semiconductor layer 19 of the TFT, polysilicon (p-Si) may be used instead.

The color filter substrate 14 is provided with a black matrix 21, a color filter 22, and a common electrode 23. The black matrix 21 is provided in the form of matrix so as to fit the pixel region of the array substrate 13. The color filter 22 is formed with color materials of different colors including red (R), green (G), and blue (B), which are provided in a region surrounded by the black matrix 21. The common electrode 23 is provided in such a way as to cover the color filter 22. This, however, is not meant to limit the application of the invention in any way. For example, in a case where an in-plane switching mode is adopted, no common electrode may be provided. In the case of monochrome display, no color filter may be provided. Furthermore, in the case of complementary color display, the color filter may be composed of more than three colors instead of three primary colors.

Figure 4A:
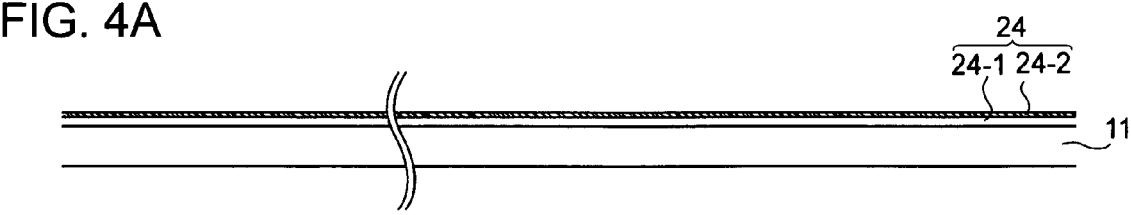
FIGS. 4A to 4F are sectional views showing a manufacturing process of the array substrate shown in FIG. 1 until the completion of an upper auxiliary capacitance electrode.

Next, the manufacturing process of the array substrate 13 of the above-described liquid crystal display device 10 will be described with reference to FIGS. 4A to 4F and FIGS. 5A to 5D. First, as shown in FIG. 4A, a conductive material layer 24 composed of an Al alloy layer 24-1 having a predetermined thickness and an Mo layer 24-2 having a predetermined thickness is formed on the transparent substrate 11. Used as the Al alloy layer 24-1 are, for example, Al—Nd and Al—Ta. Al—Nd and Al—Ta are particularly suited for use as an Al alloy layer because they suffer less from the development of microscopic projections called hillocks. The Mo layer 24-2 does not necessarily have to be used, but the absence thereof makes the Al alloy layer 24-1 easily-oxidizable and easily suffer from the development of microscopic holes called pin holes. Such problems can be avoided by using the Mo layer 24-2.

Figure 4B:
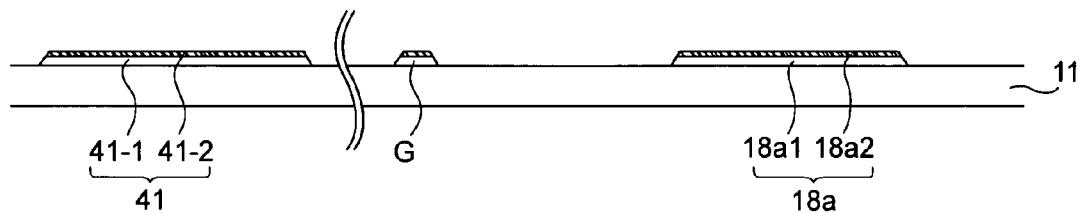

As shown in FIG. 4B, patterning is performed by conventionally known photolithography. As a result of this patterning, part of the conductive material layer 24 is removed by etching, followed by the formation of a plurality of the scanning lines 16 that extend transversely, the gate electrodes G each connected to one of the scanning lines 16, and the auxiliary capacitance lines 18 provided one for each space between the plurality of the scanning lines 16. Also, as shown in FIG. 3, terminal portions 41 are formed at the outer edge of the array substrate 13. These terminal portions 41 are provided for inputting a driving signal fed from outside to the conductors in a case where, for example, a driver IC is mounted. As shown in FIG. 3, for a small liquid crystal display device, it is often the case that a plurality of the terminal portions 41 are formed side by side on one side of the liquid crystal display device.

In FIG. 4B, there are shown the gate electrode G, a lower auxiliary capacitance electrode 18a, and the terminal portion 41 that are contained in one pixel region, the gate electrode G extending from the scanning line 16, the lower auxiliary capacitance electrode 18a being formed by widening a portion of the auxiliary capacitance line 18 and being composed of an Al alloy layer 18a1 and an Mo layer 18a2, and the terminal portion 41 being composed of an Al alloy layer 41-1 and an Mo layer 41-2. The lower auxiliary capacitance electrode 18a serves as an auxiliary capacitance electrode portion formed in the auxiliary capacitance line 18.

Figure 4C:
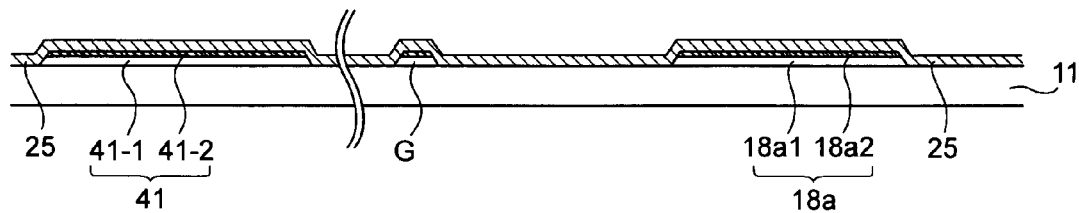

Next, as shown in FIG. 4C, the transparent substrate 11 on which the scanning line 16 and the auxiliary capacitance line 18 are formed by the above-described process step is heated in a vacuum apparatus to a high temperature, for example, to a temperature of 250 to 350° C., so as to form a first insulating film 25 that is made of silicon nitride and has a predetermined thickness (for example, 3000 Å) on the surface thereof in the usual manner by plasma CVD (chemical vapor deposition) or the like.

Figure 4D:
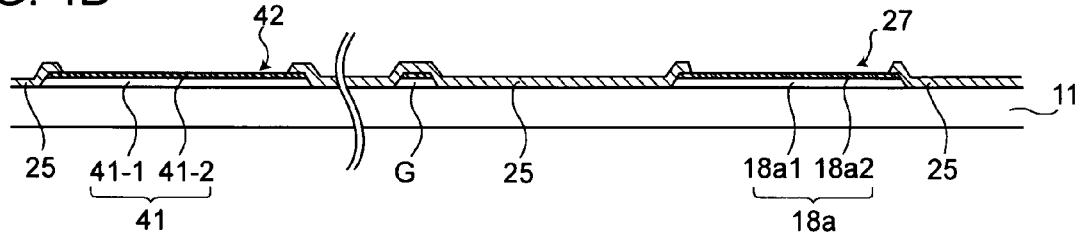

Then, as shown in FIG. 4D, the first insulating film 25 laid on the lower auxiliary capacitance electrode 18a and the terminal portion 41 of each pixel region is removed by plasma etching (PE), which is one type of dry etching. Removal of the first insulating film 25 laid on the lower auxiliary capacitance electrode 18a results in the formation of a window portion 27; removal of the first insulating film 25 laid on the terminal portion 41 results in the formation of an opening 42. The PE is an isotropic dry etching, and accordingly has a moderate etching condition. This makes it possible to perform etching while leaving the Mo layer 18a2 in the window portion 27 and the Mo layer 41-2 in the opening 42 intact. In this case, if reactive ion etching (RIE), which is another type of dry etching, is adopted, ion sputtering and chemical reaction of etching gas occur simultaneously, resulting in the removal of the Mo layer 18a2 in the window portion 27 and the Mo layer 41-2 in the opening 42. Thus, it is preferable to adopt the PE. As described above, if the PE is adopted when the window portion 27 and the opening 42 are formed by removing the first insulating film 25 laid on the auxiliary capacitance forming region 18a and the terminal portion 41, it is possible to leave the Mo layers 18a2 and 41-2 intact at the time of removal of the first insulating film 25. This helps reduce thermal load on the Al alloy layers 18a1 and 41-1 laid on the auxiliary capacitance forming region 18a and the terminal portion 41, respectively.

Figure 4E:
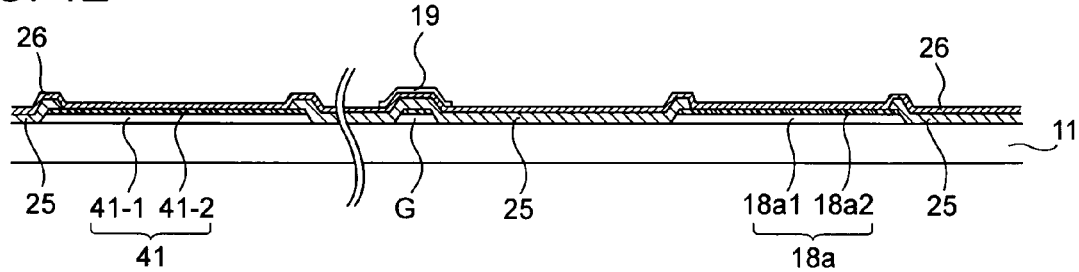

Thereafter, as shown in FIG. 4E, a second insulating film 26 is formed all over the surface of the transparent substrate 11 by plasma CVD or the like. The second insulating film 26 is made of silicon nitride having a predetermined thickness (e.g., 1000 Å) that is thinner than that of the first insulating film 25. At this point, each pixel region is coated with a two-layer insulating film composed of the first insulating film 25 and the second insulating film 26 with the exceptions of the lower auxiliary capacitance electrode 18a and the terminal portion 41. For the lower auxiliary capacitance electrode 18a, the window portion 27 is coated with the second insulating film 26. In the region of the terminal portion 41, coating of the second insulating film 26 is so performed as to cover the opening 42 formed in the first insulating film 25. Thus, the edge of the opening 42 formed in the first insulating film 25 is coated with the second insulating film 26. In this region, both the first insulating film 25 and the second insulating film 26 serve as a gate insulating film. On the other hand, the second insulating film 26 laid on the lower auxiliary capacitance electrode 18a serves as a dielectric for the formation of the auxiliary capacitance.

In this case, it is preferable that the total thickness of the first insulating film 25 and the second insulating film 26 be 2500 to 5500 Å, which is a conventionally adopted thickness, so as to prevent electrostatic breakdown of the gate electrode G of the TFT. The thickness of the second insulating film 26 should be thin, preferably 500 to 1500 Å, as long as no short circuit occurs. The second insulating film 26 less than 500 Å thick is undesirable because this is likely to cause a short circuit between the lower auxiliary capacitance electrode 18a and the upper auxiliary capacitance electrode 18b. On the other hand, the second insulating film 26 more than 1500 Å thick is also undesirable because this causes a decrease in the auxiliary capacitance.

Then, a semiconductor film composed of, for example, an a-Si layer and an n+a-Si layer is formed all over the surface of the second insulating film 26 so as to have a predetermined thickness (for example, the a-Si layer is 1300 Å thick and the n+a-Si layer is 300 Å thick). Thereafter, the semiconductor film thus formed is removed by RIE in such a way that the semiconductor layer 19 is left on the surface of the second insulating film 26 laid on the gate electrode G of the TFT.

Figure 4F:
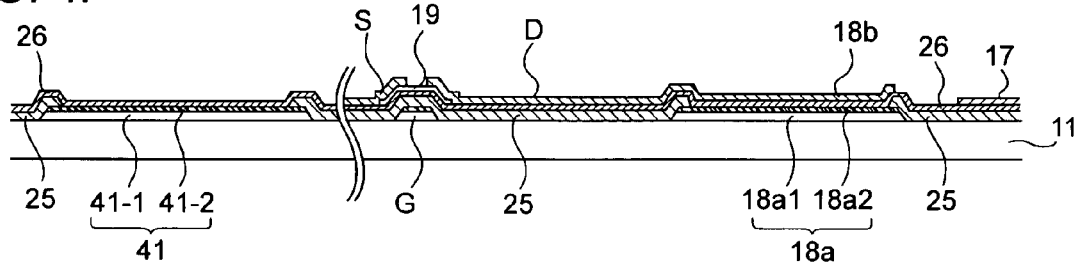

Next, a conductive material layer composed of an Al alloy layer and an Mo layer is formed over the transparent substrate 11. Although the Mo layer does not necessarily have to be used, it is better to form it because the Al alloy layer adheres poorly to the transparent conductive material such as ITO. Then, as shown in FIG. 1 and FIG. 4F, the signal line 17, the source electrode S, the drain electrode D, and the upper auxiliary capacitance electrode 18b are patterned. A plurality of the signal lines 17 extend in a direction orthogonal to the scanning lines 16. The source electrode S extends from the signal line 17 and is then connected to the semiconductor layer 19. The upper auxiliary capacitance electrode 18b is located on the surface of the second insulating film 26 laid on the lower auxiliary capacitance electrode 18a. One end of the drain electrode D is connected to the semiconductor layer 19. In this way, the TFT, which serves as a switching element, is formed near each of the intersections of the scanning lines 16 and the signal lines 17 laid on the transparent substrate 11. Although the descriptions heretofore deal with an example in which the upper auxiliary capacitance electrode 18b and the drain electrode D are integrated together into a single member, the upper auxiliary capacitance electrode 18b and the drain electrode D may be provided separately.

Figure 5A:
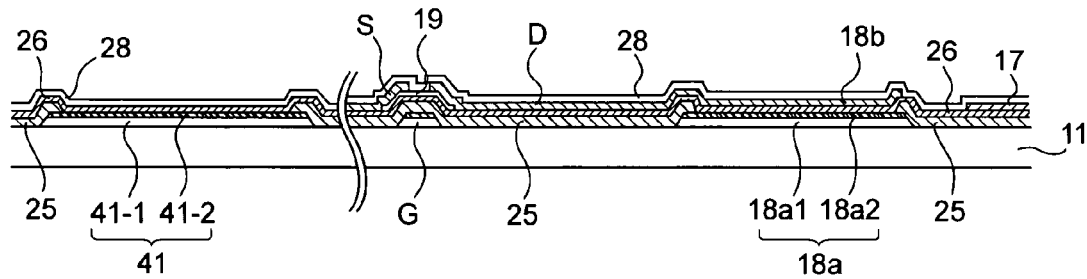
FIGS. 5A to 5D are sectional views showing the manufacturing process of the array substrate shown in FIG. 1 after the completion of the upper auxiliary capacitance electrode.

Thereafter, as shown in FIG. 5A, a third insulating film 28, which serves as a passivation film, is formed over the transparent substrate 11 so as to coat the above-described different conductors. The third insulating film 28 is provided for surface stabilization, and is made of an inorganic insulating material (e.g., silicon nitride).

Figure 5B:
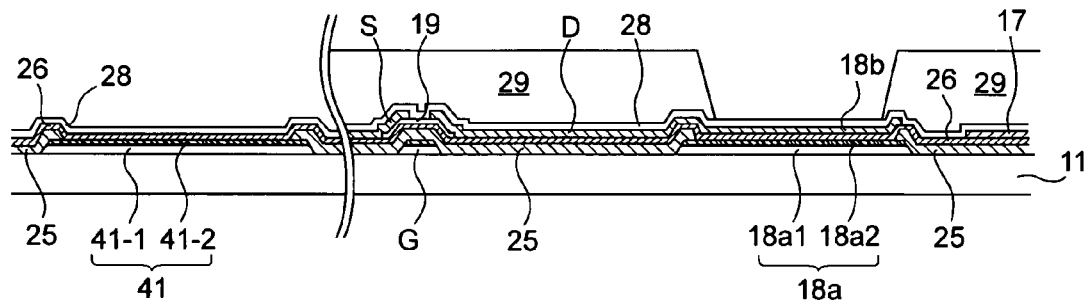

Next, as shown in FIG. 5B, an interlayer insulating layer 29 is formed for smoothing the surface of the array substrate 13. Then, in order to form, in the following step, a contact hole 30 in the interlayer insulating film laid on the upper auxiliary capacitance electrode 18b and a contact hole 43 in the interlayer insulating film laid on the terminal portion 41, the interlayer insulating film 29 present in portions where the contact holes 30 and 43 will be formed is removed. The interlayer insulating layer 29 is made of an organic insulating material such as polyimide.

Figure 5C:
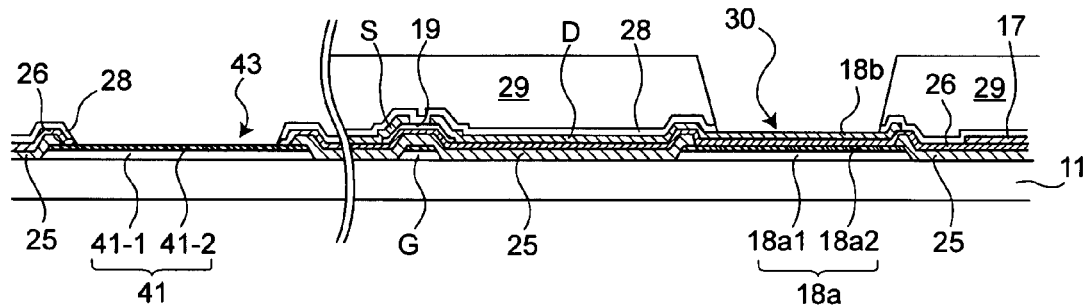

Then, as shown in FIG. 5C, the contact hole 30 is formed in the insulating film laid on the upper auxiliary capacitance electrode 18b, and the contact hole 43 is formed in the insulating film laid on the terminal portion 41.

Figure 6A:
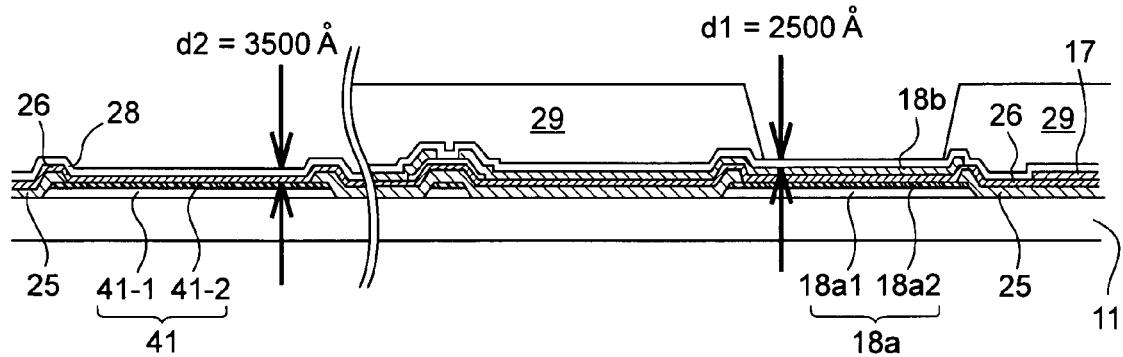
FIG. 6A is an illustration explaining the thicknesses of different portions of the embodiment before the completion of a contact hole.

When the contact holes 30 and 43 are formed, the surface of the upper auxiliary capacitance electrode 18b is coated only with the third insulating film 28. On the other hand, the surface of the terminal portion 41 is coated with a two-layer film composed of the second insulating film 26 and the third insulating film 28 (see FIG. 5B). Thus, as shown in FIG. 6A, the thickness d1 of the insulating film laid on the upper auxiliary capacitance electrode 18b equals 2500 Å, which is the thickness of the third insulating film 28, while the thickness d2 of the insulating film laid on the terminal portion 41 equals 3500 Å, which is the sum of the thickness (1000 Å) of the second insulating film 26 and the thickness (2500 Å) of the third insulating film 28. Note that FIG. 6A shows the relationship between the thickness d1 of the insulating film laid on the upper auxiliary capacitance electrode 18b and the thickness d2 of the insulating film laid on the terminal portion 41 for comparing it to that of a comparative example, which will be described later.

Here, when etching of the third insulating film 28 laid on the upper auxiliary capacitance electrode 18b is completed, the upper auxiliary capacitance electrode 18b is exposed (see FIG. 5C). On the other hand, at this point, while etching of the third insulating film 28 laid on the terminal portion 41 is completed, the second insulating film 26 is still left on the terminal portion 41. If etching of the second insulating film 26 remaining on the terminal portion 41 is continuously performed, the upper auxiliary capacitance electrode 18b remains exposed to an etching atmosphere during all that time.

However, since the thickness of the second insulating film 26 is much thinner than that of a film that serves as a gate insulating film in a conventional example, the exposure time thereof is reduced. This reduces damage to the upper auxiliary capacitance electrode 18b and the second insulating film 26 located thereunder.

When etching of the second insulating film 26 laid on the surface of the terminal portion 41 is completed, as shown in FIG. 5C, the contact hole 30 is formed on the upper auxiliary capacitance electrode 18b and the contact hole 43 is formed on the terminal portion 41. At this point, in the terminal portion 41, the edge of the opening 42 formed in the first insulating film 25 is coated with the second insulating film 26. In the contact hole 43, end faces of the second insulating film 26 and the third insulating film 28 are flush with each other. As described above, since the end faces of the second insulating film 26 and the third insulating film 28 are flush with each other in the contact hole 43, when a transparent conductive material, which will be described later, is applied, the transparent conducting material suffers less from breaks or the like.

Figure 7A:
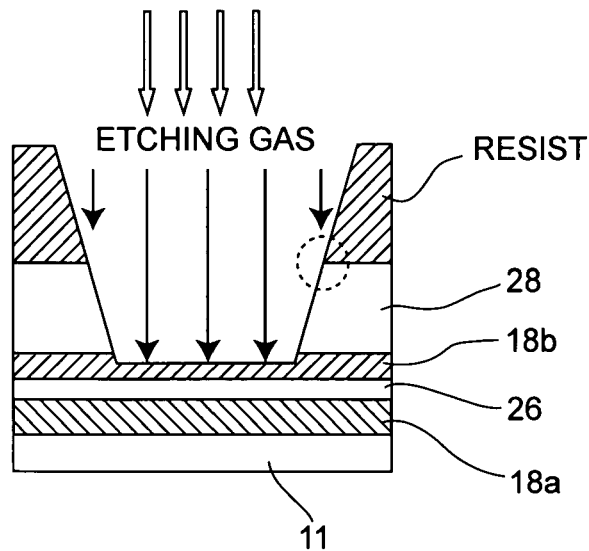
FIG. 7A is a schematic diagram showing an etching state by RIE.

Incidentally, it is preferable that PE be adopted as an etching method for forming the contact holes 30 and 43. Typically, RIE is used for etching of the third insulating film 28 laid on the upper auxiliary capacitance electrode 18b so as to form the contact hole 30. This is because RIE exhibits a high degree of anisotropy. As a result, etching of the third insulating film 28 progresses while gradually cutting away the resist applied on the third insulating film 28. This results in the formation of a tapered third insulating film 28 as shown in FIG. 7A. Such a tapered third insulating film 28 whose top and side faces form an obtuse angle (encircled by dashed lines) suffers less from a rupture in a transparent electrode material at the edge defined by the top and side faces of the third insulating film 28 when the transparent electrode material that serves as a pixel electrode is formed in the contact hole 30. However, as shown in FIG. 7A, the adoption of RIE causes damage to the upper auxiliary capacitance electrode 18b such as unnecessary etching of the upper auxiliary capacitance electrode 18b. This, however, poses no problem if the insulating film laid under the upper auxiliary capacitance electrode 18b has a sufficient thickness.

Figure 7B:
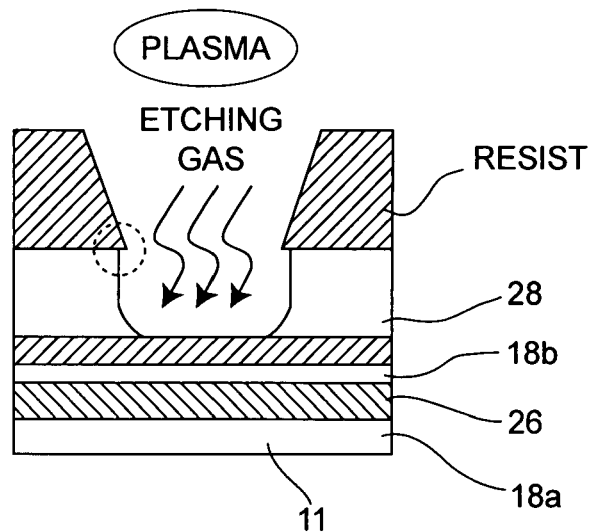
FIG. 7B is a schematic diagram showing an etching state by PE.
Figure 8A:
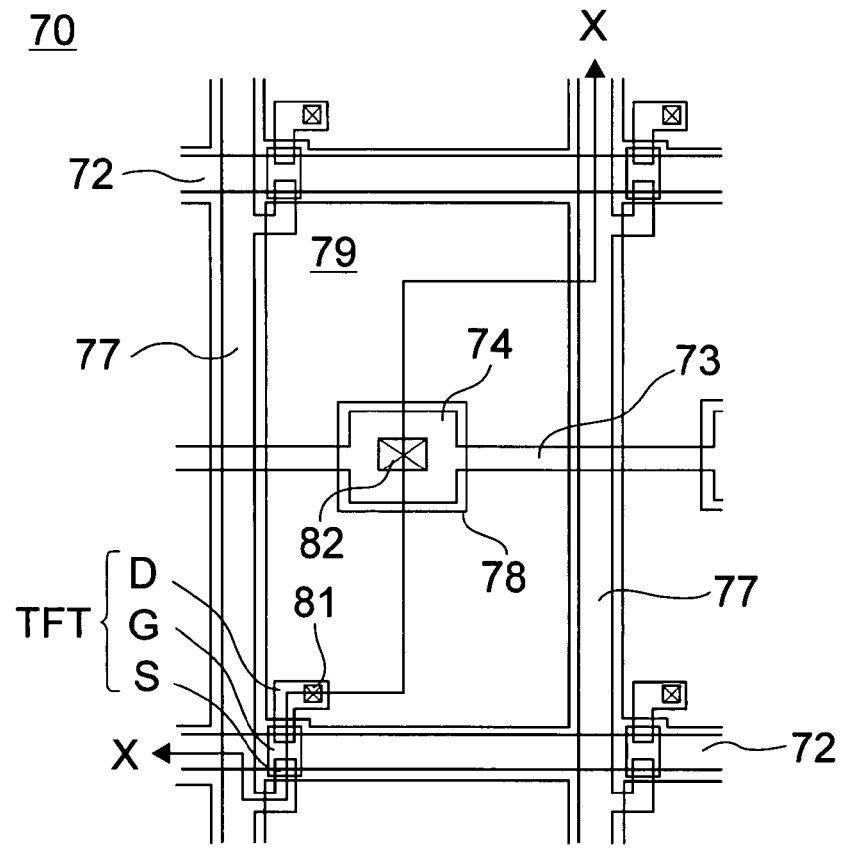
FIG. 8A is a plan view of a conventional array substrate.
Figure 8B:
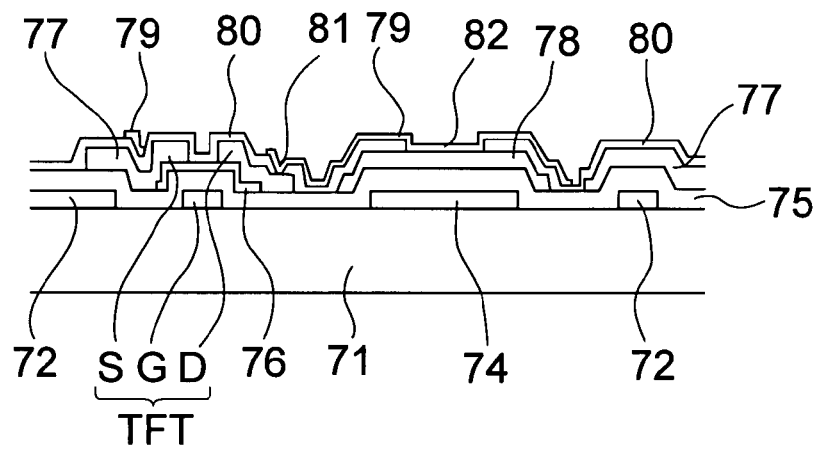
FIG. 8B is a sectional view taken on the line X-X of FIG. 8A.
Figure 9:
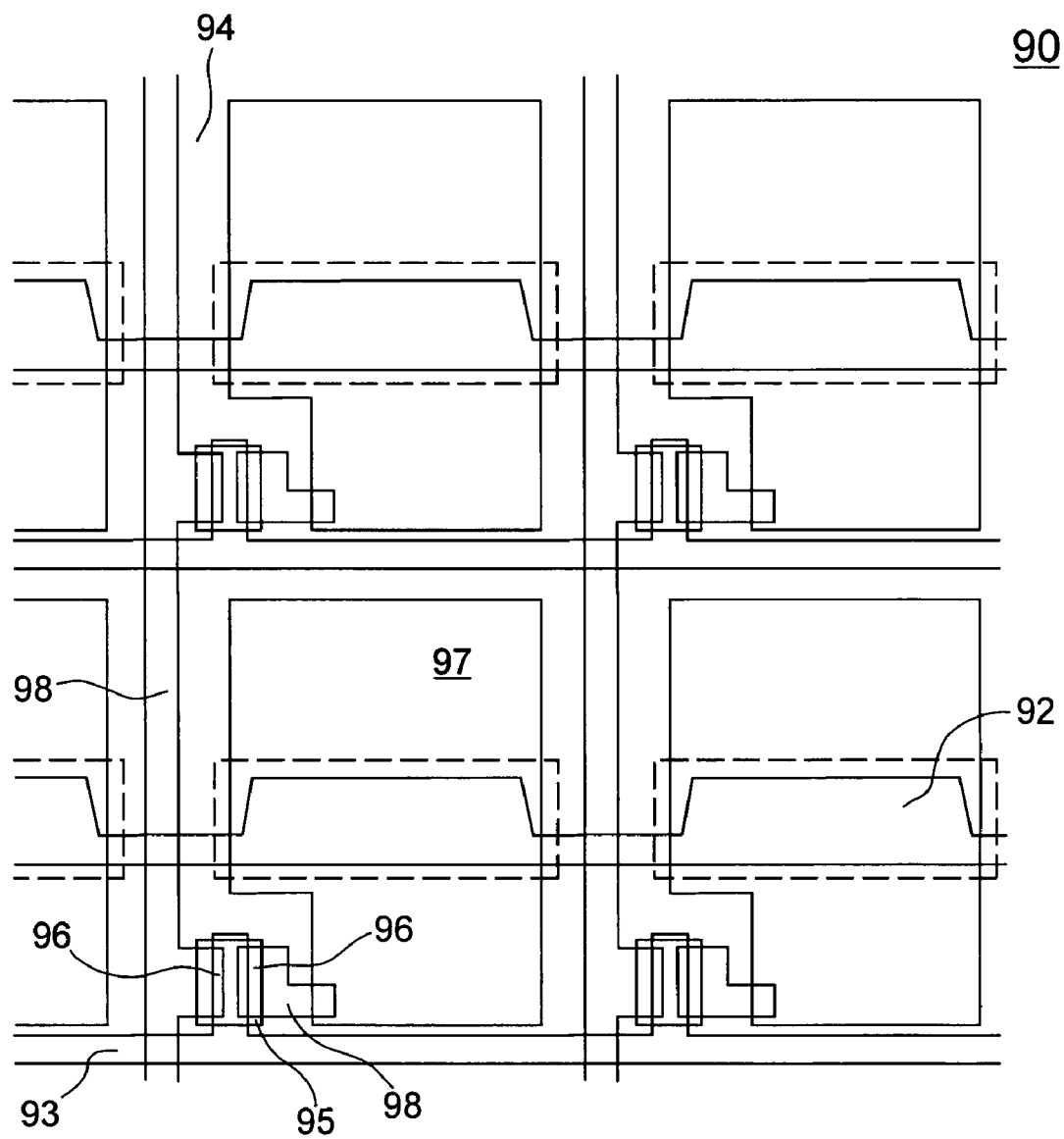
FIG. 9 is a plan view of another conventional array substrate.
Figure 10A:
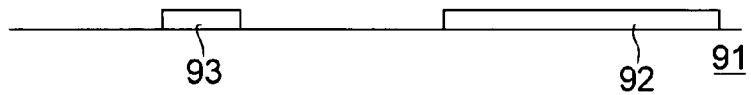
FIGS. 10A to 10G are sectional views showing a manufacturing process of the array substrate shown in FIG. 9.
Figure 10B:
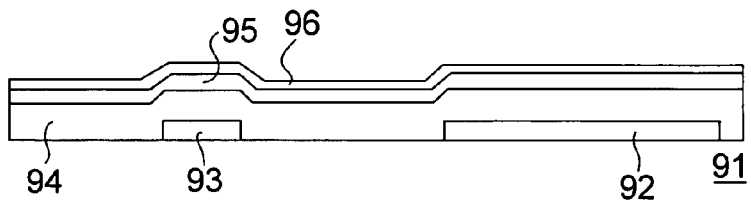
Figure 10C:
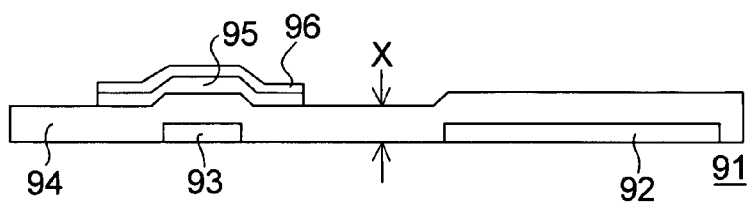
Figure 10D:
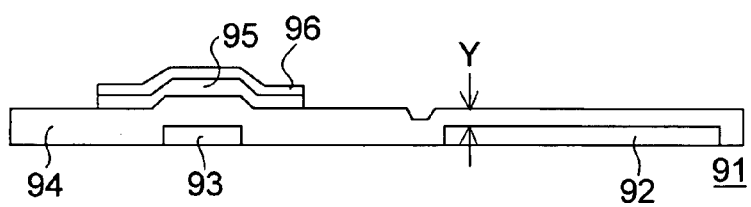
Figure 10E:
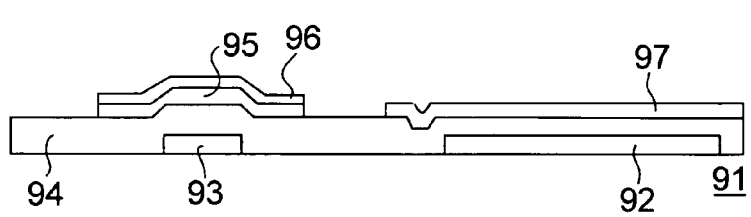
Figure 10F:
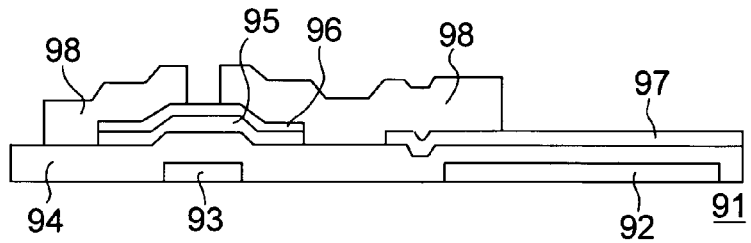
Figure 10G:
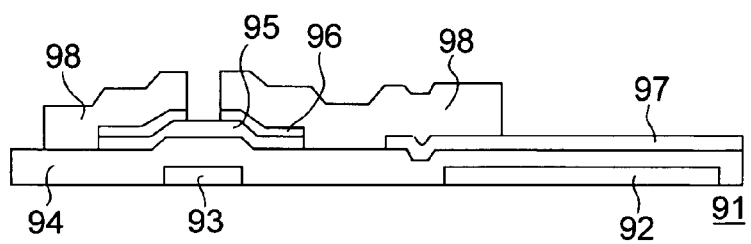

However, since the embodiment described above has a configuration in which a very thin second insulating film 26 is laid under the upper auxiliary capacitance electrode 18b, damage to the upper auxiliary capacitance electrode 18b may cause a short circuit between the lower auxiliary capacitance electrode 18a and the upper auxiliary capacitance electrode 18b. In view of this, in this embodiment, PE is used instead of RIE. Although the adoption of PE that exhibits isotropy results in the formation of a second insulating film 28 whose top and side faces form a nearly right angle (encircled by dashed lines) as shown in FIG. 7B, it is possible to reduce damage to the upper auxiliary capacitance electrode 18b.

Figure 5D:
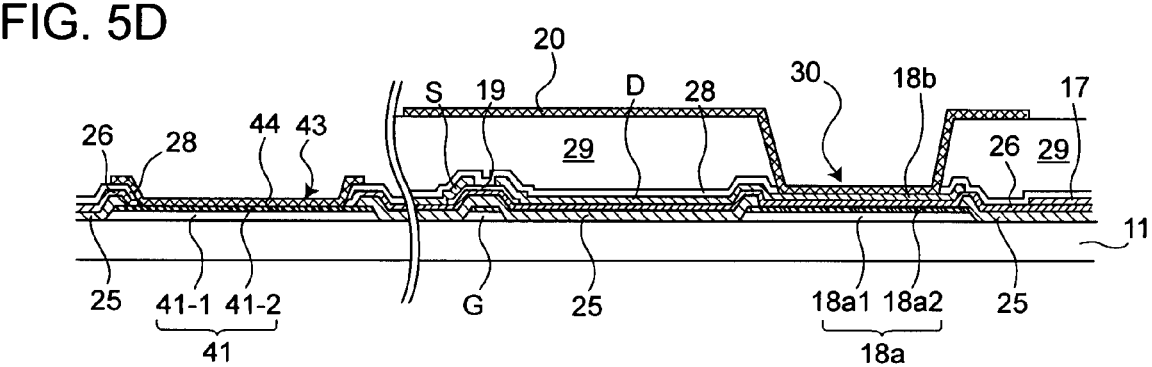

Next, a transparent electrode material made of ITO, for example, is formed all over the transparent substrate. Then, as shown in FIG. 5D, etching is performed so that the pixel electrodes 20 are formed one for each pixel region. For external connection, a conductive terminal 44 is formed on the terminal portion 41. Preferably, the pixel electrode 20 is provided in such a way that, for the purpose of preventing leakage of light, part thereof is located above the scanning line 16 and the signal line 17, and the adjacent pixel electrodes 20 are disconnected from each other. In this way, the array substrate 13 of this embodiment is manufactured.

The auxiliary capacitance of the array substrate 13 manufactured as described above is provided with the lower auxiliary capacitance electrode 18a as one electrode of a capacitor and the upper auxiliary capacitance electrode 18b as the other electrode of the capacitor. Additionally, the second insulating film 26 laid between the lower auxiliary capacitance electrode 18a and the upper auxiliary capacitance electrode 18b corresponds to a dielectric of the capacitor.

The thickness of the dielectric formed as the second insulating film 26 can be reduced to 500 to 1500 Å, which is much thinner than a conventionally used gate insulating film having a thickness of 2500 to 4500 Å. This makes it possible to dramatically increase the auxiliary capacitance without increasing the area of the lower auxiliary capacitance electrode 18a. Furthermore, since the gate electrode G and the scanning line 16 are coated with the gate insulating film composed of the first insulating film 25 and the second insulating film 26, it is possible to provide good electrical isolation and high breakdown strength.

Moreover, in this embodiment, when etching is performed on the first insulating film 25 laid on the lower auxiliary capacitance electrode 18a, the first insulating film 25 laid on the terminal portion 41 is also removed by etching. As a result, when the third insulating film 28 is formed all over the surface of the transparent substrate 11, the insulating film laid on the terminal portion 41 has a two-layer structure of the second insulating film 26 and the third insulating film 28 (see FIG. 5A). At this point, if the second insulating film 26 is thin, even when the second insulating film 26 and the third insulating film 28 laid on the terminal portion 41 are removed at the time of etching of the third insulating film 28 laid on the upper auxiliary capacitance electrode 18b, the upper auxiliary capacitance electrode 18b is exposed to an etching atmosphere only for a short time. This helps reduce damage to the upper auxiliary capacitance electrode 18b and the second insulating film 26 laid under it. This reduces the occurrence of a short circuit between the lower auxiliary capacitance electrode 18a and the upper auxiliary capacitance electrode 18b, making it possible to achieve a highly reliable liquid crystal display device 10.

COMPARATIVE EXAMPLE

The embodiment described above deals with an example in which, when etching is performed on the first insulating film 25 laid on the surface of the lower auxiliary capacitance electrode 18a, etching is also performed on the first insulating film 25 laid on the surface of the terminal portion 41 (see FIG. 4D). In order to clarify the advantages of the above-described embodiment, as a comparative example, a description will be given of a case where etching is performed on the first insulating film 25 laid on the surface of the auxiliary capacitance forming region 18a, with no etching being performed on the first insulating film 25 laid on the surface of the terminal portion 41. In other respects, the manufacturing process of the array substrate 13 of the comparative example is the same as that of the embodiment described above.

Figure 6B:
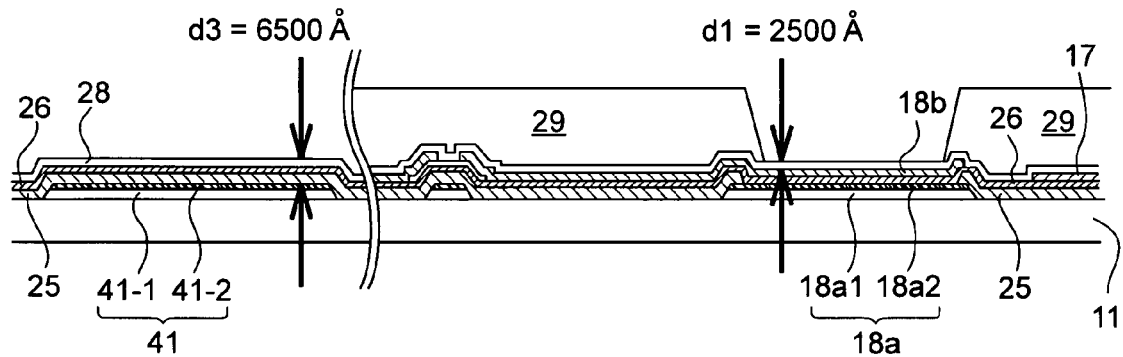
FIG. 6B is an illustration explaining the thicknesses of different portions of a comparative example before the completion of a contact hole.

The configuration of this comparative example is shown in FIG. 6B along with FIG. 6A, which corresponds to FIG. 5B of the embodiment. As will be clearly understood from a comparison between the configuration shown in FIG. 6A and the configuration shown in FIG. 6B, in the comparative example shown in FIG. 6B, the surface of the terminal portion 41 is coated with a three-layer film composed of the first insulating film 25, the second insulating film 26, and the third insulating film 28. On the other hand, in the embodiment shown in FIG. 6A, the surface of the terminal portion 41 is coated with a two-layer film composed of the second insulating film 26 and the third insulating film 28.

Thus, in the comparative example shown in FIG. 6B, the total thickness d3 of the insulating film laid on the terminal portion 41 equals 6500 Å, which is the sum of the thickness (3000 Å) of the first insulating film 25, the thickness (1000 Å) of the second insulating film 26, and the thickness (2500 Å) of the third insulating film 28. Incidentally, as is the case with the embodiment, the thickness d1 of the insulating film laid on the upper auxiliary capacitance electrode 18b equals 2500 Å.

Consider a case where the contact holes 30 and 43 are formed simultaneously. In the comparative example, when the upper auxiliary capacitance electrode 18b is exposed as a result of the insulating film (the third insulating film 28 having a thickness of 2500 Å) laid on the upper auxiliary capacitance electrode 18b being entirely removed by etching, a two-layer film (having a thickness of 4000 Å) composed of the first insulating film 25 (having a thickness of 3000 Å) and the second insulating film 26 (having a thickness of 1000 Å) is still left on the terminal portion 41.

On the other hand, in the embodiment described above, after the insulating film (the third insulating film 28 having a thickness of 2500 Å) laid on the upper auxiliary capacitance electrode 18b is entirely removed by etching, only the second insulating film (having a thickness of 1000 Å) is left on the terminal portion 41. Here, assume that etching is continuously performed on the insulating film left on the terminal portion 41 in the embodiment described above and in the comparative example even after the upper auxiliary capacitance electrode 18b is exposed. Then, in the comparative example, the upper auxiliary capacitance electrode 18b is exposed to an etching atmosphere for a much longer period than in the embodiment described above. As a result, in the comparative example, there occurs a buildup of damage to the upper auxiliary capacitance electrode 18b and the second insulating film 26 laid under it, leading to frequent occurrence of a short circuit between the lower auxiliary capacitance electrode 18a and the upper auxiliary capacitance electrode 18b.

The embodiment described above deals with an example in which the scanning line 16, the gate electrode G, or the auxiliary capacitance line 18 is composed of the Al layer 18a1 and the Mo layer 18a2. This, however, is not meant to limit the application of the invention in any way. For example, there is no need to use the Mo layer 18a2. Furthermore, as the Al layer 18a1, it is possible to use an Al layer that is commonly used as a scanning line and an auxiliary capacitance line, or an Al alloy layer of any other type.

Although the embodiment described above deals with an example in which the first insulating film 25, the second insulating film 26, and the third insulating film 28 are made of silicon nitride, they may be made of silicon oxide or aluminum oxide. However, in terms of insulation, it is preferable that the second insulating film 26 and the third insulating film 28 be made of silicon nitride.

As described above, according to the liquid crystal display device 10 of the invention, it is possible to increase an auxiliary capacitance while reducing the occurrence of a short circuit between the lower auxiliary capacitance electrode 18a and the upper auxiliary capacitance electrode 18b that together form the auxiliary capacitance. This helps reduce display trouble.

Incidentally, the invention may be modified so as to be a semi-transmissive or reflective liquid crystal display device by forming a reflective layer made of a light reflective material between the pixel electrode 20 and the interlayer insulating layer 29 or on the surface of the pixel electrode 20. That is, to obtain a semi-transmissive liquid crystal display device, it is necessary simply to form a reflective layer so as to overlap the TFT and the lower auxiliary capacitance electrode 18a, as seen in a plan view. On the other hand, to obtain a reflective liquid crystal display device, it is necessary simply to form a reflective layer so as to overlap the pixel electrode. In this case, it is preferable to form microscopic asperities on the surface of the interlayer insulating layer 29 on which the reflective layer is formed, because this gives a reflective portion a wider view angle.

What is claimed is:

1. A liquid crystal display device comprising:
 a plurality of signal lines and a plurality of scanning lines that are arranged on a transparent substrate so as to form a matrix;
 pixel regions that correspond to regions partitioned by the signal lines and the scanning lines;
 a plurality of auxiliary capacitance lines that are formed so as to be parallel with the scanning lines, the plurality of auxiliary capacitance lines being provided with auxiliary capacitance electrode portions, one for each of the pixel regions;
 upper auxiliary capacitance electrodes that are provided one for each of the auxiliary capacitance electrode portions;
 thin-film transistors that are provided one for each of the pixel regions;
 pixel electrodes that are electrically connected to drain electrodes of the thin-film transistors;
 terminal portions that are formed on the transparent substrate for receiving a signal from an outside; and
 a first insulating film, a second insulating film, and a third insulating film that are formed on the transparent substrate,
 wherein, in each of the auxiliary capacitance electrode portions,
  the first insulating film has a window portion,
  the second insulating film is formed on a surface of the first insulating film in such a way as to cover the window portion,
  the upper auxiliary capacitance electrode is formed on a surface of the second insulating film,
  the third insulating film is formed on a surface of the upper auxiliary capacitance electrode,
  the third insulating film has an auxiliary capacitance contact hole formed therein, and
  the upper auxiliary capacitance electrode and the pixel electrode are electrically connected via the auxiliary capacitance contact hole,
 wherein, in each of the terminal portions,
 in the first insulating film, the second insulating film, and the third insulating film that are laid on top of another, a terminal-portion contact hole is formed in which an edge of an opening in the first insulating film is coated with the second insulating film.

2. The liquid crystal display device of claim 1,
 wherein a total thickness of the first insulating film and the second insulating film is 2500 to 5500 Å, and
 wherein a thickness of the second insulating film is 500 to 1500 Å.

3. The liquid crystal display device of claim 1,
 wherein the upper auxiliary capacitance electrodes are each an extension of the drain electrode, the extension being located on the second insulating film in each auxiliary capacitance electrode portion.

4. A liquid crystal display device comprising:
 a plurality of signal lines and a plurality of scanning lines that are arranged on a transparent substrate so as to form a matrix;
 pixel regions that correspond to regions partitioned by the signal lines and the scanning lines;
 a plurality of auxiliary capacitance lines that are formed so as to be parallel with the scanning lines, the plurality of auxiliary capacitance lines being provided with auxiliary capacitance electrode portions, one for each of the pixel regions;
 upper auxiliary capacitance electrodes that are provided one for each of the auxiliary capacitance electrode portions;
 thin-film transistors that are provided one for each of the pixel regions;

pixel electrodes that are electrically connected to drain electrodes of the thin-film transistors;

terminal portions that are formed on the transparent substrate for receiving a signal from an outside; and a first insulating film, a second insulating film, and a third insulating film that are formed on the transparent substrate, wherein, in each of the auxiliary capacitance electrode portions, the first insulating film has a window portion, the second insulating film is formed on a surface of the first insulating film in such a way as to cover the window portion, the upper auxiliary capacitance electrode is formed on a surface of the second insulating film, the third insulating film is formed on a surface of the upper auxiliary capacitance electrode, the third insulating film has an auxiliary capacitance contact hole formed therein, and the upper auxiliary capacitance electrode and the pixel electrode are electrically connected via the auxiliary capacitance contact hole, wherein, in each of the terminal portions, in the first insulating film, the second insulating film, and the third insulating film that are laid on top of another, a terminal-portion contact hole is formed in which an opening in the first insulating film is formed concurrently with a formation of the window portion of the first insulating film in the auxiliary capacitance electrode portion.

5. A method of manufacturing a liquid crystal display device including:

a plurality of signal lines and a plurality of scanning lines that are arranged on a transparent substrate so as to form a matrix;

pixel regions that correspond to regions partitioned by the signal lines and the scanning lines;

a plurality of auxiliary capacitance lines that are formed so as to be parallel with the scanning lines, the plurality of auxiliary capacitance lines being provided with auxiliary capacitance electrode portions, one for each of the pixel regions;

thin-film transistors that are provided one for each of the pixel regions;

pixel electrodes that are electrically connected to drain electrodes of the thin-film transistors; and terminal portions that are formed in an edge portion of the transparent substrate for receiving a signal from an outside, the method comprising the steps of:

forming gate electrodes of the thin-film transistors, the scanning lines, the auxiliary capacitance lines, and the terminal portions by performing etching, after a conductive metal layer is formed all over a surface of the transparent substrate, on the conductive metal layer thus formed;

performing etching, after a first insulating film is formed in such a way as to coat an entire surface of the transparent substrate, on the first insulating film laid on the auxiliary capacitance electrode portions and the terminal portions;

forming a second insulating film in such a way as to coat the entire surface of the transparent substrate;

forming a semiconductor layer on a surface of the second insulating film in such a way as to coat top faces of the gate electrodes of the thin-film transistors;

forming, on the surface of the second insulating film, the signal lines, source electrodes and drain electrodes of the thin-film transistors, and upper auxiliary capacitance electrodes located above the auxiliary capacitance electrode portions;

forming auxiliary capacitance contact holes and terminal-portion contact holes by performing etching, after a third insulating film is formed in such a way as to coat the entire surface of the transparent substrate, on the third insulating film laid on the upper auxiliary capacitance electrodes and the second insulating film and the third insulating film laid on the terminal portions; and electrically connecting the pixel electrodes and the upper auxiliary capacitance electrodes via the auxiliary capacitance contact holes.

6. The method of claim 5, wherein a total thickness of the first insulating film and the second insulating film is 2500 to 5500 Å, and wherein a thickness of the second insulating film is 500 to 1500 Å.

7. The method of claim 5, wherein the upper auxiliary capacitance electrodes are each an extension of the drain electrode of each thin-film transistor, the extension being located on the second insulating film in each auxiliary capacitance electrode portion.

8. The method of claim 5, wherein an etching method used in the step of forming the auxiliary capacitance contact holes and the terminal-portion contact holes is plasma etching.

* * * * *

UNITED STATES PATENT AND TRADEMARK OFFICE
CERTIFICATE OF CORRECTION

PATENT NO. : 7,525,605 B2  Page 1 of 1
APPLICATION NO. : 11/802800
DATED : April 28, 2009
INVENTOR(S) : Shinichiro Nomura et al.

It is certified that error appears in the above-identified patent and that said Letters Patent is hereby corrected as shown below:

On the title page of the patent:

In Item "(75) Inventors", change the name of the fifth inventor from "Satoshi Moritai" to --Satoshi Morita--.

Signed and Sealed this

Twenty-ninth Day of September, 2009

David J. Kappos
*Director of the United States Patent and Trademark Office*